United States Patent [19]

Schutz et al.

[11] 4,092,307
[45] May 30, 1978

[54] PYRIDYL AZO ARYL METAL COMPLEX DYES

[75] Inventors: Hans Ulrich Schutz, Basel; Arthur Buhler, Rheinfelden, both of Switzerland

[73] Assignee: Ciba-Geigy Corporation, Ardsley, N.Y.

[21] Appl. No.: 670,310

[22] Filed: Mar. 25, 1976

[30] Foreign Application Priority Data

Apr. 16, 1975 Switzerland .................... 4846/75

[51] Int. Cl.² ............... C09B 45/06; C09B 45/08; C09B 45/10; C09B 45/12
[52] U.S. Cl. ........................... 260/146 R; 260/146 D
[58] Field of Search ................ 260/146 R, 156, 146 D

[56] References Cited

U.S. PATENT DOCUMENTS

| | | | |
|---|---|---|---|
| 3,875,139 | 4/1975 | Back et al. | 260/146 R |
| 3,876,625 | 4/1975 | Wittwer | 260/146 R X |
| 3,933,785 | 1/1976 | Back et al. | 260/146 R X |
| 3,946,024 | 3/1976 | Fleckenstein et al. | 260/156 |
| 3,956,263 | 5/1976 | Buehler et al. | 260/146 R |

FOREIGN PATENT DOCUMENTS

| | | | |
|---|---|---|---|
| 2,263,007 | 12/1972 | Germany | 260/156 |
| 108,620 | 1/1959 | Pakistan | 260/146 T |
| 1,416,738 | 12/1975 | United Kingdom | 260/156 |

*Primary Examiner*—Allen B. Curtis

*Attorney, Agent, or Firm*—Edward McC. Roberts; Michael W. Glynn; Prabodh I. Almaula

[57] ABSTRACT

Heavy metal complexes of azo dyes of the formula

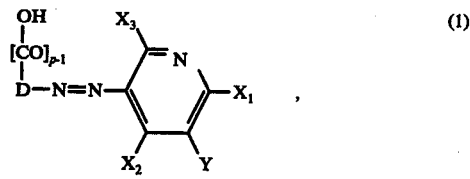

wherein D is the radical of a diazo component of the benzene or naphthalene series that carries the group —[CO]$_{p-1}$OH in ortho-position to the azo group, $p$ is 1 or 2, $X_1$ is an unsubstituted or substituted amino, alkoxy, aryloxy, alkylmercapto, arylmercapto or aralkoxy group, $X_2$ is an unsubstituted or substituted amino group or a low molecular alkyl radical, $X_3$ is an unsubstituted or substituted amino group and Y is a cyano or carbonamido group, said azo dyes of the formula (1) containing at least one of the following groups: a sulpho or sulphonamido group, a sulphonamido group which is substituted by low molecular alkyl, phenyl or phenyl which carries non-ionogenic substituents, a low molecular alkylsulphonyl group or a phenylsulphonyl group which is unsubstituted or substituted by non-ionogenic substituents.

3 Claims, No Drawings

PYRIDYL AZO ARYL METAL COMPLEX DYES

The present invention provides heavy metal complexes of azo dyes of the formula

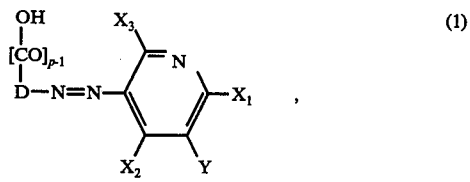

wherein D is the radical of a diazo component of the benzene or naphthalene series that carries the group —[CO]$_{p-1}$OH in ortho-position to the azo group, p is 1 or 2, $X_1$ is an unsubstituted or substituted amino, alkoxy, aryloxy, alkylmercapto, arylmercapto or aralkoxy group, $X_2$ is an unsubstituted or substituted amino group or a low molecular alkyl radical, $X_3$ is an unsubstituted or substituted amino group and Y is a cyano or carbonamido group, said azo dyes of the formula (1) containing at least one of the following groups: a sulpho or sulphonamido group, a sulphonamido group which is substituted by low molecular alkyl, phenyl or phenyl which carried nonionogenic substituents, a low molecular alkylsulphonyl group or a phenylsulphonyl group which is unsubstituted or substituted by non-ionogenic substitutents. Substituted or unsubstituted amino groups represented by $X_1$, $X_2$ and $X_3$ are —NH$_2$, low molecular N-monoalkylamino or N,N-dialkylamino groups, in which the alkyl moiety is unsubstituted, for example, by hydroxyl, cyano, sulpho, sulphonamido, low molecular alkylsulphonyl or alkoxy or by phenyl, or are arylamino groups, in particular phenyl or naphthylamino groups, in which the phenyl or naphthyl moiety can carry still further substituents, for example low molecular alkyl or alkoxy, nitro, carboxy, sulpho, sulphonamido, low molecular alkylsulphonyl or acylamino. In addition, $X_1$, $X_2$ and $X_3$ can represent a cyclic amino group, for example the morpholino, pyrrolidino, piperidino, piperazino, or thiomorpholino group. At least one of the radicals $X_2$ and $X_3$ must be an unsubstituted or at most a monosubstituted amino group in order to make a complexing of the metal atom possible.

A aryloxy or an arylmercapto group represented by $X_1$ is in this context primarily the phenoxy and phenylmercapto group respectively. The terms "alkoxy" and "alkylmercapto" denote radicals containing 1 to 6 carbon atoms, and aralkoxy is primarily the benzyloxy radical.

Preferably, $X_1$ and $X_2$ are substituted or unsubstituted amino groups.

Possible heavy metals are chiefly copper, nickel, cobalt and chromium. The term "low molecular" denotes radicals containing 1 to 4 carbon atoms.

The water-solubilising groups, i.e. the sulpho groups, the sulphonamido, alkylsulphonamido, or phenylsulphonamido groups which are unsubstituted or substituted at the phenyl nucleus by non-ionogenic substituents, or phenylsulphonyl groups which are unsubstituted or substituted by non-ionogenic substituents, are attached primarily to the radicals $X_1$ and D. Possible substituents are, for example, methyl or methoxy.

The metal complexes of the present invention are obtained by reacting an azo compound of the formula (1) in the ratio 1:1 with copper, nickel or chromium donors, or in the ratio 2:1 with chromium or cobalt donors.

The dyes of the formula (1) can exist in several tautomeric forms. For the sake of simplicity, only one of these tautometric forms is described in each case herein, but it will be readily understood that throughout this specification reference is always intended to compounds in each of the possible tautomeric forms.

The copper, cobalt and chromium complexes of azo dyes according to the invention of the formula

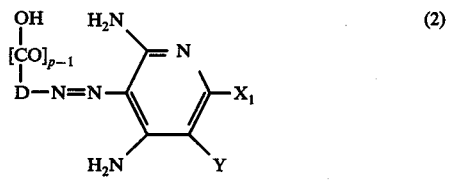

wherein D, Y, p and $X_1$ are as defined hereinbefore, are preferred.

The radical D is derived primarily from an aminophenol or aminonaphthol or from the corresponding methoxy compounds or from an anthranilic acid, and can carry one or two of the following substituents: sulpho, sulphonamido, sulphonamido which is mono- or disubstituted by low molecular alkyl or phenyl, chlorine, bromine, nitro, trifluoromethyl, cyano, low molecular alkyl and alkoxy radicals, arylazo, low molecular alkylsulphonyl, phenylsulphonyl, acyl, acyloxy or acylamino groups.

The term "acyl" denotes herein primarily low molecular alkanoyl and alkoxycarbonyl as well as the benzoyl group. Possible acylamino groups are in addition the known fibre-reactive groups, for example low molecular alkanoyl or alkenoyl which is substituted by chlorine or bromine, unsubstituted low molecular alkenoyl, and triazinyl or pyrimidyl which is substituted by halogen, in particular fluorine, bromine or chlorine. In addition to carrying the halogen atoms, these last mentioned heterocyclic compounds can also carry an aryl or alkyl radical, for example a methyl or ethyl radical, or a low molecular alkylmercapto group or in particular a NH$_2$ group or an amino group which is substituted by low molecular alkyl and/or aryl. "Aryl" denotes herein above all, for example, phenyl which is substituted by methyl, methoxy or sulpho.

As arylazo radicals, mention may be made primarily of the phenylazo and the sulphophenylazo radicals.

Examples of suitable diazo components for the manufacture of dyes of the formula (1) are: anthranilic acid, 4-sulpho- and 4-sulphoamidoanthranilic acid, 2-amino-1-hydroxybenzene, 2-amino-1-methoxybenzene, 4-chloro- and 4,6-dichloro-2-amino-1-hydroxybenzene, 4- or 5-nitro-2-amino-1-hydroxybenzene, 4-chloro- and 4-methyl- and 4-acetylamino-6-nitro-2-amino-1-hydroxybenzene, 6-acetylamino- and 6-chloro-4-nitro-2-amino-1-hydroxybenzene, 4-cyano-2-amino-1-hydroxybenzene, 4-methoxy-2-amino-1-hydroxybenzene, 2-amino-1-hydroxybenzene-5-methylsulphone and -5-benzylsulphone, 2amino-1-hydroxybenzene-4-methyl-, -ethyl-, -chloromethyl-and -butylsulphone, 5-nitro- and 6-nitro-2-amino-1-hydroxybenzene-4-methylsulphone, 2-amino-1-hydroxybenzene-4- or -5-sulphamide, 2-amino-1-hydroxybenzene-4- or -5-sulph-N-methyl- and -sulph-N-β-hydroxyethylamide, 2-amino-1-methoxybenzene-4-sulphanilide, 4-methoxy-5-chloro-2-amino-1-hydroxybenzene, 4-methyl-2-amino-1- hydroxybenzene, 4-chloro-5-nitro-2-amino-1-hydroxybenzene, 4,5-dichloro-2-amino-1-hydroxybenzene, 3,4,6-trichloro-2-amino-1-hydroxybenzene, 6-acetylamino-4-chloro-2-amino-1-hydroxybenzene, 4,6-dinitro-2-amino-1-hydroxybenzene, 4-nitro-2-amino-1-hydroxybenzene-5- or -6-sulphonamide, 4- or 5-chloroanisidine, 4- or 5-nitroanisidine, 2-methoxy-5-methylaniline, 2,5-dimethoxyaniline, 2-anisidine-4- or -5-β-hydroxyethylsulphone, 2-amino-1-hydroxybenzene-4- or -5-sulphonic acid, 4-nitro-2-amino-1-hydroxybenzene-5- or -6-sulphonic acid, 5-nitro- or 6-nitro-2-amino-1-hydroxybenzene-4-sulphonic acid, 6-chloro-2-amino-1-hydroxybenzene-4-sulphonic acid, anisidine-4- or -5-sulphonic acid, 1-amino-2-hydroxynaphthalene-4-sulphonic acid, 4-(4'-sulphophenylazo)-2-amino-1-hydroxybenzene, 4-(3'-sulphonamidophenylazo)-2-amino-1-hydroxybenzene.

The introduction of reactive acylamino groups is effected preferably by acylating corresponding diazo components which, in addition to containing the amino group to be diazotised, also contain a further acylatable amino group or a group which can be converted into such a group, for example by reduction or saponification, for example a nitro or acetylamino group.

The reactive groups can be introduced before or after the coupling or also not until after the metallising.

Diazo components which are suitable for introducing a reactive radical are, for example, 6-acetylamino-4-chloro-2-amino-1-hydroxybenzene, 6-acetylamino-1-amino-2-naphthol-4-sulphonic acid or 4-nitro-2-amino-1-hydroxybenzene-6-sulphonic acid.

Suitable acylating agents are, for example, chloroacetyl or bromoacetyl chloride, α,β-dichloropropionic chloride or α,β-dibromopropionic chloride, chloromaleic anhydride, acrylic chloride, α-chloroacrylic chloride or α-bromoacrylic chloride, trichloroacrylic chloride, chlorocrotonyl chloride, propionic chloride, 2,4,5,6-tetrachloropyramidine or 2,4,5,6-tetrafluoropyrimidine, 2,4,6-trifluoro-5-chloropyrimidine, 2,4,6-trichloro-, 2,4,6-tribromo- or 2,4,6-trifluorotriazine, 4,6-dichloro-, 4,6-dibromo- or 4,6-difluorotroazines which in 2-position carry a $NH_2$ group, a low molecular alkylamino or alkoxy group, 2-chlorobenzthiazole-carboxylic acid chloride, 1,4-dichlorophthalazine-6-carboxylic acid chloride, 2,3-dichloroquinoxaline-6-carboxylic acid chloride.

As suitable coupling components for the manufacture of the dyes of formula (1) there may be mentioned for example: 2-(3'-sulphophenylamino)-3-cyano-4,6-diamino-pyridine, 2-phenylamino-3-cyano-4,6-diaminopyridine, 2-(4'-α-bromoacryloylamino-phenylamino)-3-cyano-4,6-diaminopyridine, 2-cyclohexylamino-3-cyano-4,6-diamino-pyridine, 2-(3'-sulpho-4'-α-bromoacryloylamino-phenylamino)-3-cyano-4,6-diamino-pyridine, 2-[3'-sulpho-4'-(4''-chloro-6''-amino-s-triazinyl-2-amino)-phenyl-amino]-3-cyano-4,6-diaminopyridine.

These coupling components can be obtained by reacting 2-bromo-3-cyano-4,6-diamino-pyridine with a primary or secondary amine, a hydroxy or mercapto compound.

The halogeno-diamino-pyridines can be obtained according to: Boldt et al., Angew. Chemie, vol. 82 (1970), page 392; Cossey et al., Angew. Chemia, vol. 84 (1972), page 1184; Middleton, U.S. Pat. No. 2,790,806; Sasaki et al., Tetrahedron Letters, (1971), page 4593.

The cyano group of the above 3-cyano-4,6-diaminopyridines can be saponified to the carbonamido group.

The 4,6-diamino-pyridine which is unsubstituted in 3-position can be obtained by splitting off the carbonamido group by hydrolysis.

Particularly preferred metal complexes are especially copper, nickel and cobalt complexes of azo compounds of the formula

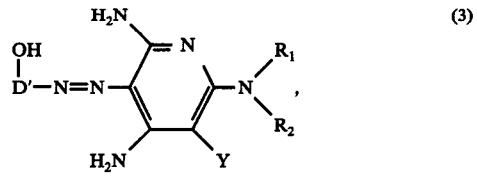

wherein D' is a benzene or naphthalene radical which carries the hydroxyl group in ortho-position to the azo group and optionally contains as further substituents one or two sulpho groups, low molecular alkyl or alkoxy groups, chlorine or bromine atoms, trifluoromethyl, nitro, phenylazo, sulphophenylazo, acyl, acyloxy, acylamino, alkylsulphonyl, phenylsulphonyl, sulphonamido, alkylsulphonamido, phenylsulphonamido or cyano groups, $R_1$ is a hydrogen atom or a low molecular alkyl group, $R_2$ is a sulphoaryl radical or a low molecular sulphoalkyl radical, or $R_1$ and $R_2$, together with the nitrogen atom to which they are attached, form a morpholino, thiomorpholino, pyrrolidino, piperidino or piperazino radical, and Y is as defined hereinbefore. Preferably $R_1$ is hydrogen and $R_2$ is a sulphoaryl radical, for example a sulphonaphthyl group or in particular a sulphophenyl radical which, in addition to the sulpho group, can contain further substituents, for example low molecular alkyl or alkoxy, nitro or acylamino.

Preferred metal complexes are also the copper, nickel, cobalt or chromium complexes of azo dyes of the formula

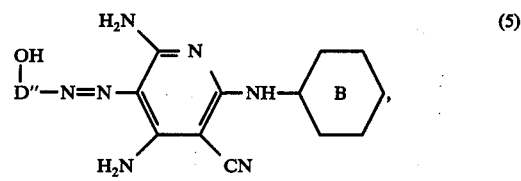

wherein D'' is a benzene or naphthalene radical which carries the hydroxyl group in ortho-position to the azo group and contains a sulpho, sulphonamido, alkylsulphonamido, phenylsulphonamido, alkylsulphonamido or phenylsulphonyl group and which furthermore can also be substituted by chlorine or nitro, and wherein the benzene ring B is unsubstituted or substituted by low molecular alkyl or alkoxy, nitro or acylamino.

The manufacture of the metal complexes of the present invention is accomplished by methods which are known per se in an aqueous or organic medium. The copper, nickel and cobalt complexes are manufactured in a weakly acid to alkaline range, the 1:1 chromium complexes in an acid medium, and the 1:2 chromium complexes in a neutral to weakly alkaline medium. The process is carried out, for example, with copper sulphate in an aqueous medium in the presence of sodium acetate or ammonia, or with copper nitrate in the presence of sodium carbonate in an organic medium, for example methyl cellosolve. Copper, nickel and cobalt salts are used as metal donors, for example copper sulphate, copper nitrate, nickel sulphate, cobalt sulphate, cobalt acetate, or the freshly distilled hydroxides of these metal ions, or salts of trivalent chromium, for example chromium formiate, chromium sulphate, chromium chloride hexahydrate or chromium fluoride. Trivalent chromium can also be produced in the reaction mixture, for example, from chromate, by simultaneously adding a reducing agent.

The reaction is carried out as a rule with heating, for example at about the boiling point of the solvent used or slightly below it.

The dyes of the present invention are suitable for dyeing and printing natural polyamide materials, such as wool, silk, leather and, above all, synthetic polyamides, such as nylon. Aqueous dye liquors are used for example, at pH values of 4 to 8.

The dyeings obtained with the dyes of the present invention are characterised by purity, depth and brightness of shade. They produce level dyeings and have in general good fastness properties, such as fastness to washing, rubbing, water and light.

The invention is illustrated by the following Examples, in which the parts and percentages are by weight, unless otherwise stated.

EXAMPLE 1

1:2 Chromium complex of the azo dye of the formula

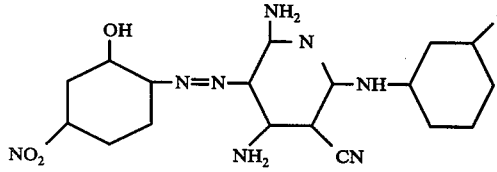

4.7 parts of the dye obtained in the normal manner by alkaline coupling of diazotised 5-nitro-2-amino-1-hydroxybenzene to 2,4-diamino-5-cyano-6-anilino-(3'-sulpho)-pyridine are dissolved in 200 parts of water. After adding an aqueous solution of sodium chromium salicylate which contains 0.3 part of chromium, the reaction mixture is refluxed. After the metallising is terminated the dye is precipitated by adding common salt, filtered off with suction and dried, to yield a black powder which dissolves very readily in water to give a violet solution and which dyes wool and polyamide from a weakly acid bath in violet shades of very good fastness to light and wet treatments.

EXAMPLE 2

1:2 Cobalt complex of the azo dye of the formula

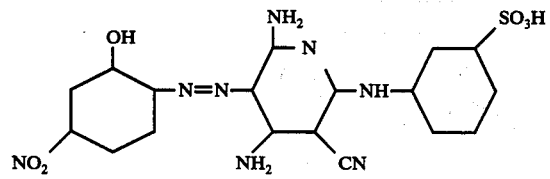

4.7 parts of the dye described in Example 1 are dissolved in 200 parts of water. After addition of 6.5 parts by volume of a 1-molar cobalt sulphate solution the reaction mixture is adjusted to pH 8.5 with sodium hydroxide and stirred at 80°–90° C until it is no longer possible to detect any starting dye. When the reaction is terminated the dye is precipitated by adding common salt, filtered off with suction and dried. The dye, which is obtained in the form of a black powder which is readily soluble in water, dyes wool and polyamide from a weakly acid bath in reddish violet shades of very good fastness properties.

EXAMPLE 3

1:2 Cobalt complex of the azo dye of the formula

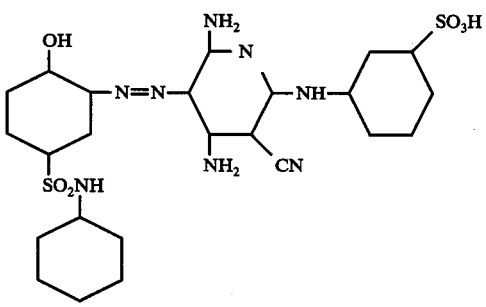

5.8 parts of the dye obtained from diazotised 2-amino-1-hydroxybenzene-4-sulphonic anilide coupled to 2,4-diamino-5-cyano-6-anilino-(3'-sulpho)-pyridine are dissolved in 200 parts of water by adding 10 parts by volume of 2 normal sodium hydroxide solution at 80° C. After adding $CoSO_4$ which contains 0.354 part of cobalt the reaction mixture is stirred for 30 minutes at 80°–85° C. When the reaction is terminated the dye is precipitated with common salt and filtered off and dried, to yield a dark red powder which dissolves in water to give a red solution and dyes wool and polyamide from a weakly acid bath in red shades of very good fastness to light and wet treatments. In analogous manner further dyes are obtained that dye wool or synthetic polyamide in the shades indicated in column III of the table by reacting the dyes in column I with the metal atoms listed in column II.

| I | | II | III |
|---|---|---|---|
| ![structure: cyclohexane with OH, SO2NH-cyclohexyl, N=N to pyridine with NH2, NH2, CN, NH-cyclohexyl-SO3H] | | \<Cr/2\> | claret |
| " | | \<Cu\> | orange |
| " | | \<Ni\> | orange |
| ![structure: cyclohexane with OH, SO2NH-cyclohexyl, N=N to pyridine with NH2, NH2, CN, N(CH3)CH2CH2SO3H] | | \<Cu\> | claret |
| " | | \<Ni\> | reddish brown |
| ![structure: cyclohexane with OH, NO2, N=N-N to pyridine with NH2, NH2, CN, NH-cyclohexyl-SO3H] | | \<Cu\> | claret |
| " | | \<Ni\> | claret |
| ![structure: cyclohexane with HO3S, OH, NO2, N=N to pyridine with H2N, H2N, CN, NH-cyclohexyl] | | \<Cr/2\> | reddish brown |
| " | | \<Co/2\> | reddish brown |
| " | | \<Cu\> | yellowish brown |
| " | | \<Ni\> | scarlet |
| ![structure: cyclohexane with HO3S, OH, Cl, N=N to pyridine with H2N, H2N, CN, NH-cyclohexyl] | | \<Cr/2\> | brown |
| " | | \<Co/2\> | claret |
| " | | \<Cu\> | red |
| " | | \<Ni\> | red |

-continued

| I | II | III |
|---|---|---|
| [structure: cyclohexane with OH, Cl, H₂N-O₂S; azo to pyridine with H₂N, NH-cyclohexyl, H₂N, CN] | <Cr/2> | claret |
| [structure: cyclohexane with OH, Cl, H₂N-O₂S; azo to pyridine with H₂N, NH-cyclohexyl, H₂N, CN] | <Co/2> | red |
| [structure: cyclohexane with OH, Cl, H₃C-O₂S; azo to pyridine with H₂N, NH-cyclohexyl, H₂N, CN] | <Cr/2> | claret |
| [structure: cyclohexane with OH, HN–SO₂–CH₃; azo to pyridine with H₂N, NHCH₂–CH₂OH, H₂N, CN] | <Cr/2> | claret |
| " | <Co/2> | red |
| [structure: cyclohexane with OH, HO₃S, NO₂; azo to pyridine with H₂N, S-cyclohexyl, H₂N, CN] | <Cr/2> | pale pink |
| [structure: cyclohexane with OH, HO₃S, NO₂; azo to pyridine with H₂N, O-cyclohexyl, H₂N, CN] | <Ni> | orange |

We claim:

1. Copper, nickel, cobalt or chromium complexes of an azo dye of the formula

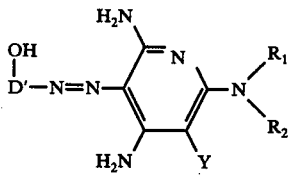

wherein D' is a benzene or naphthalene radical which carries the hydroxyl group in ortho-position to the azo group and optionally contains as further substituents one or two sulpho groups, low molecular alkyl or alkoxy groups, chlorine or bromine atoms, trifuloromethyl, nitro, phenylazo, sulphophenylazo, acyl, acyloxy, acylamino, alkylsulphonyl, phenylsulphonyl, sulphonamido, alkylsulphonamido, phenylsulphonamido or cyano groups, $R_1$ is a hydrogen atom or a low molecular alkyl group, $R_2$ is a sulphoaryl radical or a low molecular sulphoalkyl radical, or $R_1$ and $R_2$, together with the nitrogen atom to which they are attached, form a morpholino, thiomorpholino, pyrrolidino or piperazino radical, and wherein Y is a cyano or carbonamido group, said azo dye containing at least one sulpho, sulphonamido, alkylsulphonamido, phenylsulphonamido, alkylsulphonyl or phenylsulphonyl group.

2. Copper, nickel, cobalt or chromium complexes according to claim 1 of azo dyes of the formula

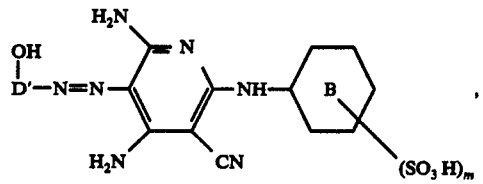

wherein D' is a benzene or naphthalene radical which carries the hydroxyl group in ortho-position to the azo group and optionally carries as further substituents low molecular alkyl or alkoxy groups, chlorine or bromine atoms, trifluoromethyl, nitro, phenylazo, sulphophenylazo, acyl, acyloxy, acylamino, alkylsulphonyl, phenylsulphonyl, sulphonamido, alkylsulphonamido, phenylsulphonamido or cyano groups, $m$ is 0, 1 or 2, and the benzene ring B can be further substituted by low molecular alkyl or alkoxy, nitro or acylamino.

3. Copper, nickel, cobalt or chromium complexes according to claim 1 of azo dyes of the formula

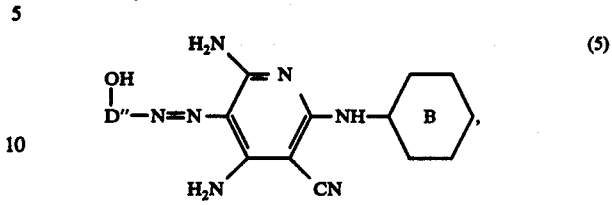

wherein D" is a benzene or naphthalene radical which carries a hydroxyl group in ortho-position to the azo group and contains a sulpho, sulphonamido, alkylsulphonamido, phenylsulphonamido, alkylsulphonyl or phenylsulphonyl group and which can furthermore be substituted by chlorine or nitro, and wherein the benzene ring B is unsubstituted or substituted by low molecular alkyl or alkoxy, nitro or acylamino.

* * * * *